(12) United States Patent
Hatakawa et al.

(10) Patent No.: US 8,638,845 B2
(45) Date of Patent: Jan. 28, 2014

(54) CHANNEL STATE INFORMATION COMPRESSING APPARATUS AND METHOD, CHANNEL STATE INFORMATION EXPANDING APPARATUS AND METHOD, COMPUTER PROGRAMS, RECEIVER, AND TRANSMITTER

(75) Inventors: Yasuyuki Hatakawa, Fujimino (JP);
Tadayuki Fukuhara, Fujimino (JP);
Riichirou Nagareda, Fujimino (JP)

(73) Assignee: KDDI Corporation, Tokyo (JP)

( * ) Notice: Subject to any disclaimer, the term of this patent is extended or adjusted under 35 U.S.C. 154(b) by 166 days.

(21) Appl. No.: 12/948,323

(22) Filed: Nov. 17, 2010

(65) Prior Publication Data

US 2011/0135021 A1 Jun. 9, 2011

(30) Foreign Application Priority Data

Dec. 8, 2009 (JP) ................ 2009-278481

(51) Int. Cl.
*H04B 1/66* (2006.01)
(52) U.S. Cl.
USPC ............ 375/240; 375/316; 375/295; 375/260
(58) Field of Classification Search
USPC .......... 375/240, 260, 267, 295, 316; 455/450; 370/329, 332; 714/776
See application file for complete search history.

(56) References Cited

U.S. PATENT DOCUMENTS

| | | | | |
|---|---|---|---|---|
| 4,467,346 | A * | 8/1984 | Mori | 348/391.1 |
| 5,786,857 | A * | 7/1998 | Yamaguchi | 375/240.03 |
| 7,746,802 | B2 * | 6/2010 | Suh et al. | 370/252 |
| 8,020,075 | B2 * | 9/2011 | Kotecha | 714/776 |
| 8,121,207 | B2 * | 2/2012 | Yun et al. | 375/260 |
| 2005/0043031 | A1 * | 2/2005 | Cho et al. | 455/450 |
| 2007/0196072 | A1 * | 8/2007 | Zhou et al. | 385/147 |

(Continued)

FOREIGN PATENT DOCUMENTS

| | | |
|---|---|---|
| JP | 06-178281 A | 6/1994 |
| JP | 2009-530899 A | 8/2009 |

(Continued)

OTHER PUBLICATIONS

3GPP TS 36.211 "3rd Generation Partnership Project; Technical Specification Group Radio Access Network; Evolved Universal Terrestrial Radio . . . ", V8.7.0, pp. 53-54, May 2009.

(Continued)

*Primary Examiner* — Shuwang Liu
*Assistant Examiner* — Helene Tayong
(74) *Attorney, Agent, or Firm* — Morgan, Lewis & Bockius LLP (57) ABSTRACT

A channel state information compressing apparatus includes a time-to-frequency region converter that converts a region for channel state information which indicates a state of each communication channel from a time region to a frequency region; and an adaptive selector that selects each frequency component to be included in compressed data based on electric power of the frequency component from among frequency region data obtained by the time-to-frequency region converter. The channel state information compressing apparatus outputs the compressed data consisting of each selected frequency component, and information for identifying each frequency component which forms the compressed data.

12 Claims, 3 Drawing Sheets

(56) References Cited

U.S. PATENT DOCUMENTS

| | | | |
|---|---|---|---|
| 2007/0211813 A1* | 9/2007 | Talwar et al. | 375/267 |
| 2007/0279296 A1* | 12/2007 | Sarabandi et al. | 343/700 MS |
| 2008/0187062 A1* | 8/2008 | Pan et al. | 375/260 |
| 2008/0229177 A1 | 9/2008 | Kotecha | |
| 2008/0320072 A1* | 12/2008 | Sakanoue et al. | 709/202 |
| 2009/0323818 A1* | 12/2009 | Weiss et al. | 375/240.18 |
| 2010/0008431 A1* | 1/2010 | Wu et al. | 375/244 |

FOREIGN PATENT DOCUMENTS

| | | |
|---|---|---|
| JP | 2009-239723 A | 10/2009 |
| WO | 2006/126655 A1 | 11/2006 |
| WO | WO 2007/108624 | 9/2007 |
| WO | 2009/020174 A1 | 2/2009 |

OTHER PUBLICATIONS

Vu et al., "MIMO Wireless Linear Precoding [Using CSIT to improve link performance]", IEEE Signal Processing Magazine, pp. 86-105, Sep. 2007.

Chinese Office Action and English translation issued in corresponding Chinese Patent Application No. 201010588430.1 on Feb. 5, 2013.

Huawei, Sensitivity of DL/UL Performance to CQI-Compression with Text Proposal, Ad Hoc Meeting on LTE R1-060228, Jan. 25, 2006.

Japanese Office Action dated May 7, 2013 in corresponding Japanese Patent Application No. 2009-278481.

Japanese Office Action dated Jul. 30, 2013, issued in Japanese Patent Application No. 2009-278481.

* cited by examiner

| DCT POINT INDEX NUMBER | ELECTRIC POWER |
|---|---|
| 0 | 10 |
| 1 | 5 |
| 2 | 8 |
| 3 | 7 |
| 4 | 9 |
| 5 | 1 |
| 6 | 1 |
| 7 | 2 |
| 8 | 1 |
| 9 | 7 |
| 10 | 1 |
| 11 | 1.5 |
| 12 | 2 |
| 13 | 1 |
| 14 | 1.5 |

CHANNEL STATE INFORMATION COMPRESSING APPARATUS AND METHOD, CHANNEL STATE INFORMATION EXPANDING APPARATUS AND METHOD, COMPUTER PROGRAMS, RECEIVER, AND TRANSMITTER

BACKGROUND OF THE INVENTION

1. Field of the Invention

The present invention relates to a channel state information compressing apparatus and a corresponding method, a channel state information expanding apparatus and a corresponding method, computer programs, a receiver, and a transmitter.

Priority is claimed on Japanese Patent Application No. 2009-278481, filed Dec. 8, 2009, the contents of which are incorporated herein by reference.

2. Description of the Related Art

For advanced wireless communication system, employment of a MIMO (multiple input and multiple output) system has been examined. In the MIMO system, a transmitter precodes transmitted data based on CSI (channel state information) which indicates the state of a signal transmission path (i.e., communication channel), which can improve the efficiency in frequency usage in comparison with a case of performing no precoding (see, for example, M. Vu and A. Paulraj, "MIMO Wireless Linear Precoding", IEEE Signal Processing Magazine, pp. 86-105, September, 2007).

Additionally, when employing an FDD (frequency division duplex) method, the channel state information is generally obtained by a receiver. As a method of precoding transmitted data based on the channel state information, the following two methods are known (see, for example, 3GPP TS 36.211 V.8.7.0, pp. 53-54, May 2009):

(i) A receiver obtains a channel response matrix, and sends it to a transmitter. The transmitter then performs precoding in accordance with the channel response matrix.

(ii) A transmitter and a receiver commonly have a codebook which includes index numbers of a plurality of precoders. The receiver obtains a channel response matrix, and sends the index number of a precoder corresponding to the channel response matrix to the transmitter. The transmitter uses a precoder which has the relevant index number.

In the above method (i), the transmitter can perform precoding by using the channel response matrix obtained by the receiver. However, the amount of information of the channel response matrix sent from the receiver to the transmitter is large, which requires a large amount of wireless resources used for transmitting the information.

In the above method (ii), the amount of information sent from the receiver to the transmitter can be reduced. However, the number of precoder types, which can be recorded in the codebook, is limited. Therefore, if there is no precoder suitable for the channel response matrix obtained by the receiver, the effect of precoding is degraded.

SUMMARY OF THE INVENTION

In light of the above circumstances, an object of the present invention is to provide a channel state information compressing apparatus and a corresponding method, a computer program, and a receiver, for performing information compression while securing adequate accuracy of the channel state information.

Another object of the present invention is to provide a channel state information expanding apparatus and a corresponding method, a computer program, and a transmitter, which correspond to the above channel state information compressing apparatus and the corresponding method, the relevant computer program, and the receiver.

Therefore, the present invention provides a channel state information compressing apparatus comprising:

a time-to-frequency region converter that converts a region for channel state information which indicates a state of each communication channel from a time region to a frequency region; and an adaptive selector that selects each frequency component to be included in compressed data based on electric power of the frequency component from among frequency region data obtained by the time-to-frequency region converter, wherein the channel state information compressing apparatus outputs the compressed data consisting of each selected frequency component, and information for identifying each frequency component which forms the compressed data.

In a typical example, the adaptive selector selects a predetermined number of frequency components in order of an amount of the electric power from the largest to the smallest.

In a preferable example, wherein the adaptive selector selects a predetermined number of frequency components in order of an amount of the electric power from the largest to the smallest until the total amount of the electric power of the frequency components to be included in the compressed data reaches a predetermined value.

In another typical example, the time-to-frequency region converter performs discrete cosine transform.

In another preferable example:

the time-to-frequency region converter performs discrete cosine transform; and the adaptive selector selects a predetermined number of frequency components in order of frequency of each frequency component from the lowest to the highest until the total amount of the electric power of the frequency components to be included in the compressed data reaches a predetermined value.

The present invention also provides a channel state information expanding apparatus comprising:

an information compensator that complements compressed data of frequency region data for channel state information which indicates a state of each communication channel, with each missing frequency component based on information for identifying each frequency component which forms the compressed data; and a frequency-to-time region converter that converts a region of the frequency region data complemented by the information compensator from a frequency region to a time region.

In a typical example, the frequency-to-time region converter performs inverse discrete cosine transform.

The present invention also provides a channel state information compressing method comprising the steps of:

converting a region for channel state information which indicates a state of each communication channel from a time region to a frequency region;

selecting each frequency component to be included in compressed data based on electric power of the frequency component from among frequency region data obtained by the converting step;

outputting the compressed data consisting of each selected frequency component, and information for identifying each frequency component which forms the compressed data.

The present invention also provides a channel state information expanding method comprising the steps of: complementing compressed data of frequency region data for channel state information which indicates a state of each communication channel, with each missing frequency component based on information for identifying each frequency component which forms the compressed data; and converting a region of the complemented frequency region data from a frequency region to a time region.

The present invention also provides a computer program for making a computer execute the steps of:

converting a region for channel state information which indicates a state of each communication channel from a time region to a frequency region;

selecting each frequency component to be included in compressed data based on electric power of the frequency component from among frequency region data obtained by the converting step;

outputting the compressed data consisting of each selected frequency component, and information for identifying each frequency component which forms the compressed data.

Accordingly, the above-described channel state information compressing apparatus can be implemented using a computer.

The present invention also provides a computer program for making a computer execute the steps of:

complementing compressed data of frequency region data for channel state information which indicates a state of each communication channel, with each missing frequency component based on information for identifying each frequency component which forms the compressed data; and converting a region of the complemented frequency region data from a frequency region to a time region.

Accordingly, the above-described channel state information expanding apparatus can be implemented using a computer.

The present invention also provides a receiver in a MIMO system, comprising:

a time-to-frequency region converter that converts a region for channel state information between the receiver and a transmitter in the MIMO system;

an adaptive selector that selects each frequency component to be included in compressed data based on electric power of the frequency component from among frequency region data obtained by the time-to-frequency region converter; and a sending unit that sends the transmitter the compressed data consisting of each selected frequency component, and information for identifying each frequency component which forms the compressed data.

The present invention also provides a transmitter in a MIMO system, comprising:

a receiving unit that receives compressed data of frequency region data for channel state information between the transmitter and a receiver in the MIMO system and information for identifying each frequency component which forms the compressed data, from the receiver;

an information compensator that complements the compressed data with each missing frequency component based on the information for identifying each frequency component which forms the compressed data;

a frequency-to-time region converter that converts a region of the frequency region data complemented by the information compensator from a frequency region to a time region; and a precoding unit that precodes data to be transmitted in the MIMO system by using channel state information obtained by the frequency-to-time region converter.

In accordance with the present invention, it is possible to perform information compression while securing adequate accuracy of the channel state information

DETAILED DESCRIPTION OF THE INVENTION

Hereinafter, embodiments of the present invention will be described with reference to the appended figures.

Figure 1:
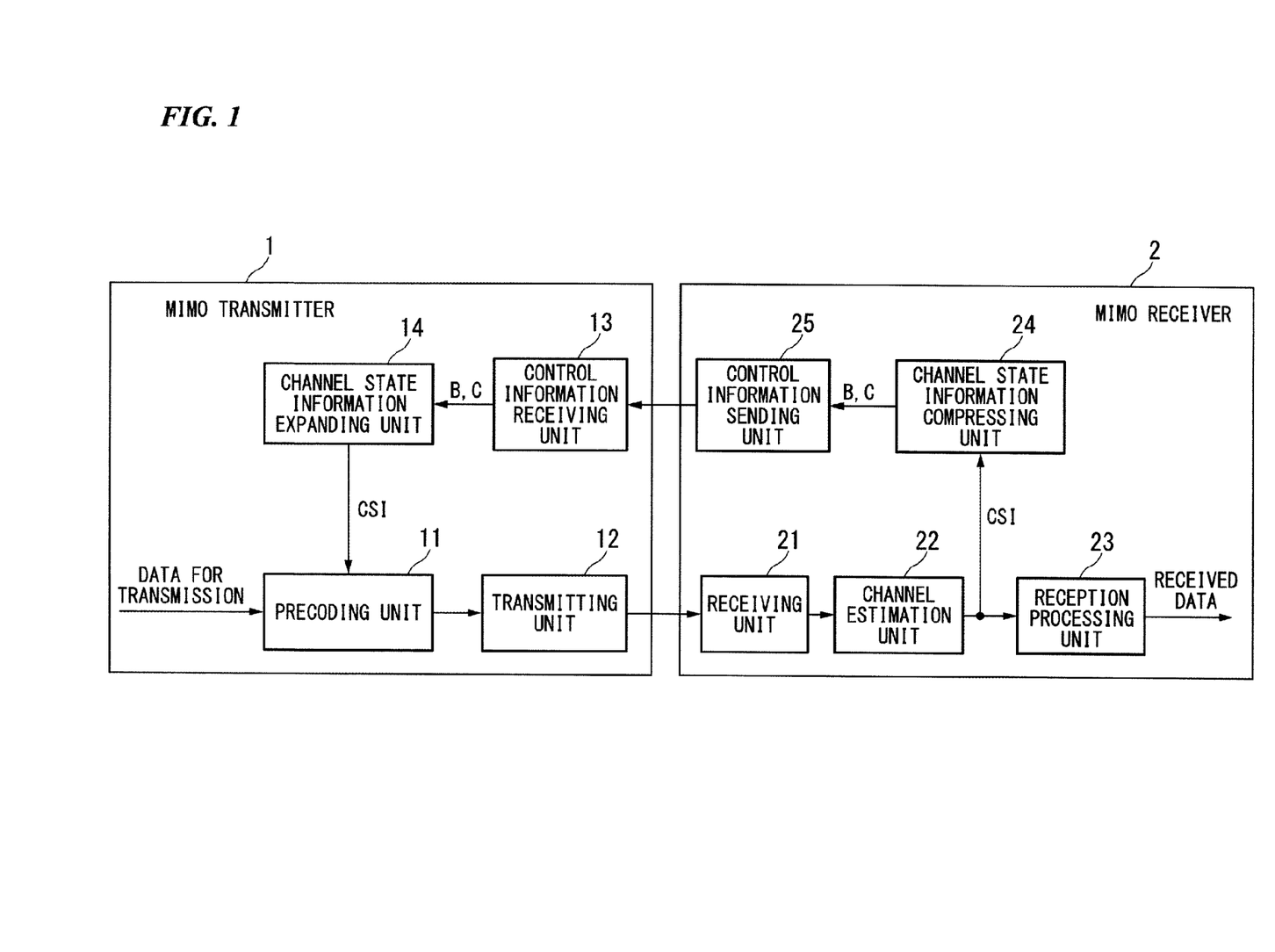
FIG. 1 is a block diagram showing the general structure of a wireless communication system relating to an embodiment of the present invention.

FIG. 1 is a block diagram showing the general structure of a wireless communication system relating to an embodiment of the present invention. The wireless communication system has a MIMO transmitter 1 and a MIMO receiver 2, where MIMO transmission is performed from the MIMO transmitter 1 to the MIMO receiver 2.

In FIG. 1, the MIMO transmitter 1 has a precoding unit 11, a transmitting unit 12, a control information receiving unit 13, and a channel state information expanding unit 14.

The precoding unit 11 performs precoding of data to be transmitted, by using channel state information (CSI). The transmitting unit 12 has a plurality of transmission antennas, and sends precoded data via the transmission antennas. The control information receiving unit 13 receives control information from the MIMO receiver 2, where the control information has channel state information compression encoded data B and control data C. The channel state information expanding unit 14 obtains channel state information by using the channel state information compression encoded data B and the control data C, and supplies the obtained channel state information to the precoding unit 11.

The MIMO receiver 2 has a receiving unit 21, a channel estimation unit 22, a reception processing unit 23, a channel state information compressing unit 24, and a control information sending unit 25.

The receiving unit 21 has a plurality of reception antennas, and receives signals transmitted through the transmission the antennas of the MIMO transmitter 1. The channel estimation unit 22 estimates the channel state information (CSI) by using the signals received by the reception antennas. The reception processing unit 23 performs a reception process using the channel state information, thereby obtaining received data. The channel state information compressing unit 24 generates the channel state information compression encoded data B by using the channel state information estimated by the channel estimation unit 22, and outputs the channel state information compression encoded data B and the control data C to the control information sending unit 25. The control information sending unit 25 sends the channel state information compression encoded data B and the control data C to the MIMO transmitter 1.

Figure 2:
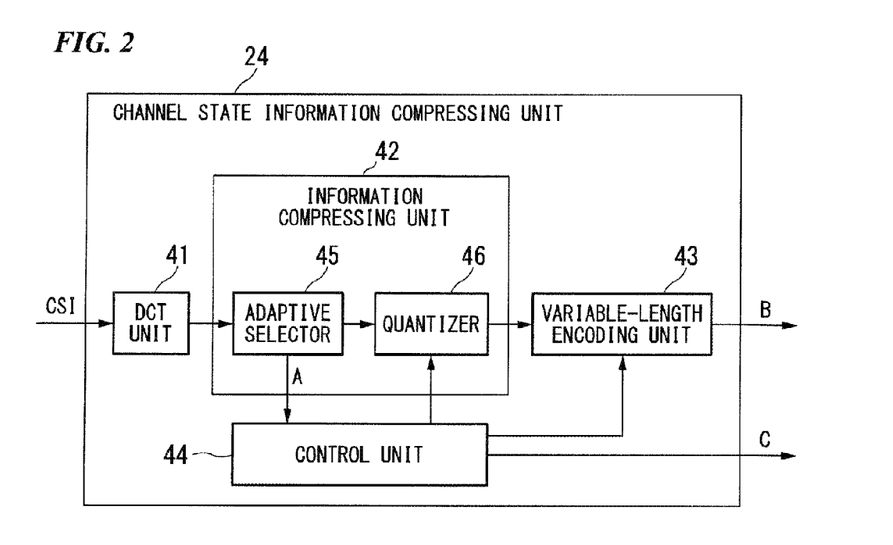
FIG. 2 is a block diagram showing the structure of the channel state information compressing unit 24 in FIG. 1.
Figure 3:
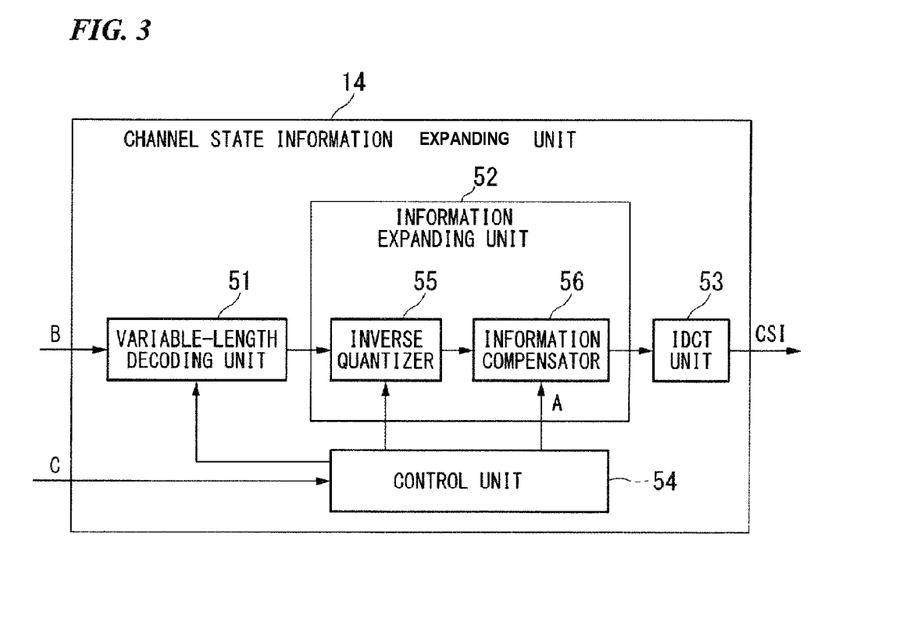
FIG. 3 is a block diagram showing the structure of the channel state information expanding unit 14 in FIG. 1.

FIG. 2 is a block diagram showing the structure of the channel state information compressing unit 24 in FIG. 1. FIG. 3 is a block diagram showing the structure of the channel state information expanding unit 14 in FIG. 1.

Referring to FIG. 2, the channel state information compressing unit 24 will be explained below. In FIG. 2, the channel state information compressing unit 24 has a DCT (discrete cosine transform) unit 41, an information compressing unit 42, a variable-length encoding unit 43, and a control unit 44. The information compressing unit 42 includes an adaptive selector 45 and a quantizer 46.

The DCT unit receives channel state information (CSI) from the channel estimation unit 22, and subjects the channel state information to the discrete cosine transform. Discrete cosine transform data obtained by the DCT of the channel state information is output to the information compressing unit 42. The discrete cosine transform data includes DCT coefficients as information of each frequency component.

The information compressing unit 42 compresses the frequency component information included in the discrete cosine transform data based on electric power of the data, that is, reduces the number of bits of the information or partially deletes the information. The information compressing unit 42 outputs the compressed data obtained by the information compression of the discrete cosine transform data to the variable-length encoding unit 43.

The variable-length encoding unit 43 subjects the compressed data received from the information compressing unit 42 to variable-length encoding, and outputs channel state information compression encoded data B, which is obtained by the variable-length encoding, to the control information sending unit 25.

In the information compressing unit 42, the information compression of the discrete cosine transform data is performed by the adaptive selector 45 and the quantizer 46. The adaptive selector 45 selects each frequency component to be included in the compressed data from among the discrete cosine transform data, based on electric power of the frequency component. The adaptive selector 45 outputs information of the frequency component selected from the discrete cosine transform data, to the quantizer 46. The quantizer 46 performs bit allocation for the information of the frequency component input from the adaptive selector 45, in accordance with an instruction issued from the control unit 44.

The adaptive selector 45 also outputs DCT point index information A to the control unit 44. The DCT point index information A is information used for specifying each frequency component which forms the compressed data. More specifically, the DCT point index information A consists of identifiers of the relevant DCT coefficients (DCT point index numbers), so that the DCT coefficients included in the compressed data are specified by the identifiers.

The control unit 44 controls the operations of the quantizer 46 and the variable-length encoding unit 43. The control unit 44 outputs control data C relating to the channel state information compression encoded data B to the control information sending unit 25, where the control data C includes the DCT point index information A.

Next, referring to FIG. 3, the channel state information expanding unit 14 will be explained. In FIG. 3, the channel state information expanding unit 14 has a variable-length decoding unit 51, an information expanding unit 52, an IDCT (inverse discrete cosine transform) unit 53, and a control unit 54. The information expanding unit 52 includes an inverse quantizer 55 and an information compensator 56. The structural elements in FIG. 3 respectively correspond to those shown in FIG. 2.

The variable-length decoding unit 51 receives the channel state information compression encoded data B from the control information receiving unit 13, and subjects the channel state information compression encoded data B to variable-length decoding. The variable-length decoding unit 51 outputs compressed data obtained by the variable-length decoding to the information expanding unit 52.

The information expanding unit 52 subjects the compressed data received from the variable-length decoding unit 51 to information expansion, which is performed by the inverse quantizer 55 and the information compensator 56 in the information expanding unit 52. The information expanding unit 52 outputs discrete cosine transform data obtained by the information expansion of the compressed data to the IDCT unit 53.

The IDCT unit 53 outputs channel state information (CSI) obtained by the inverse discrete cosine transform performed by the IDCT unit 53 to the precoding unit 11.

The control unit 54 receives the control data C from the control information receiving unit 13, and controls the operations of the variable-length decoding unit 51 and the information expanding unit 52 based on the control data C. The control data C includes the DCT point index information A. The control unit 54 outputs the DCT point index information A included in the control data C to the information compensator 56.

In accordance with an instruction issued from the control unit 54, the inverse quantizer 55 obtains information of each frequency component of the discrete cosine transform data, from the compressed data.

The information compensator 56 complements the discrete cosine transform data, which consisting of the information of the frequency components obtained by the inverse quantizer 55, with information of each missing frequency component based on the DCT point index information A. Accordingly, discrete cosine transform data having no missing frequency component is generated.

Although DCT is used as time-to-frequency region conversion for converting the region for the channel state information from the time region to the frequency region, another time-to-frequency region conversion method may be employed. For example, as the time-to-frequency region conversion, DFT (discrete Fourier transform) or DWT (discrete wavelet transform) may be employed.

Next, some specific examples of the information compressing unit 42 in FIG. 2 and the information expanding unit 52 in FIG. 3 will be shown.

Specific Example 1

In Specific Example 1, the adaptive selector 45 selects each frequency component to be included in compressed data from among the discrete cosine transform data in order of the amount of electric power (i.e., the higher the electric power of the frequency component, the earlier the frequency component is selected). The operations of the information compressing unit 42 and the information expanding unit 52 in Specific Example 1 will be explained in detail below.

First, the information compressing unit 42 will be explained. The adaptive selector 45 receives discrete cosine transform data from the DCT unit 41, where the discrete cosine transform data includes DCT coefficients as information of each frequency component. For convenience of explanation, it is assumed that the discrete cosine transform data of the DCT results consists of 15 DCT coefficients having DCT point index numbers 0 to 14. Here, the DCT point index number 0 corresponds to a DCT coefficient of a direct current (DC) component, and the greater the DCT point index number, the higher the frequency component of the DCT coefficient.

Figure 4:
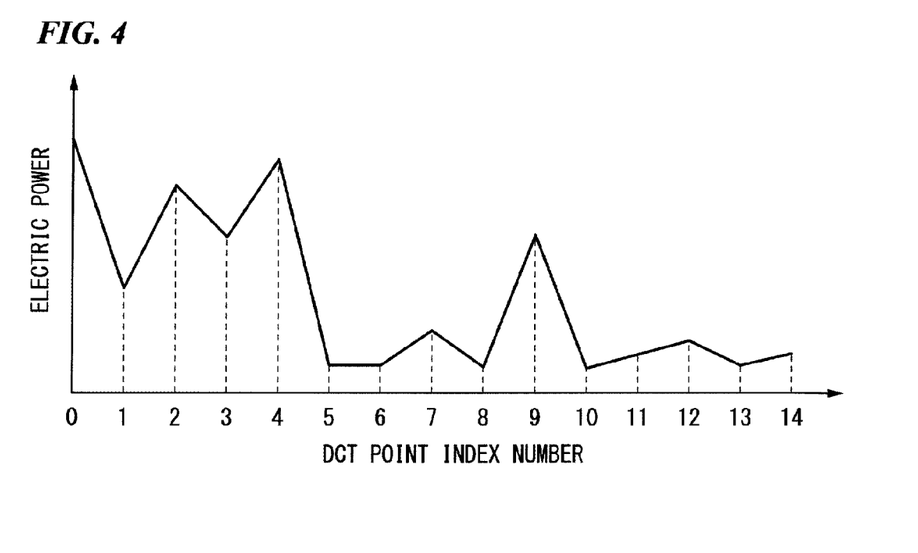
FIG. 4 is a diagram showing a concrete example used for explaining the channel state information compressing method and the channel state information expanding method for the embodiment.
Figure 5:
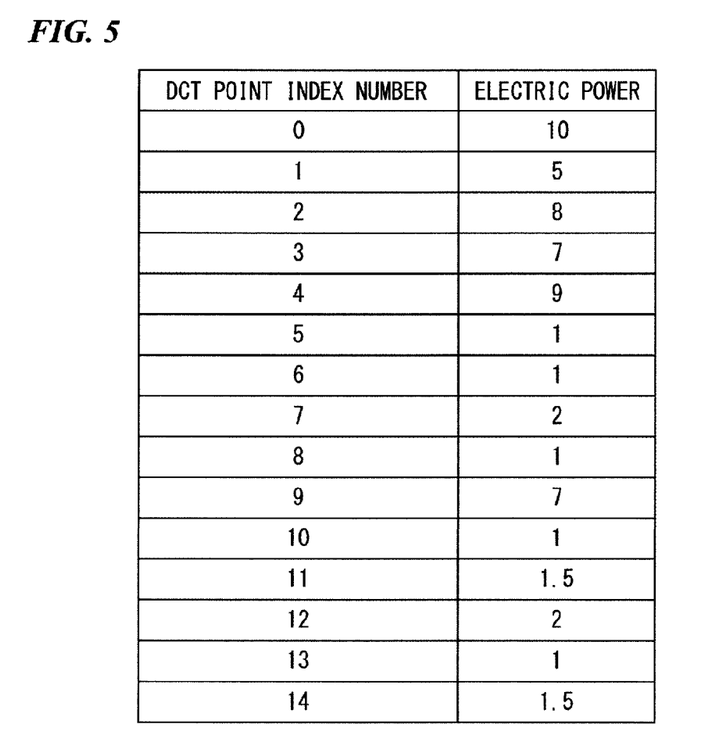
FIG. 5 is also a diagram showing the concrete example used for explaining the channel state information compressing method and the channel state information expanding method for the embodiment.

For each DCT point index number, the adaptive selector 45 computes the electric power of the frequency component by using the DCT coefficient specified by the DCT point index number. More specifically, the DCT coefficient consists of a real part and an imaginary part, and the sum of the square of the real part and the square of the imaginary part of the DCT coefficient is computed as the electric power of the frequency component corresponding to the DCT coefficient. Accordingly, the adaptive selector 45 computes 15 electric power values corresponding to the DCT point index numbers 0 to 14. FIGS. 4 and 5 show concrete examples of the computed results for convenience of the explanation.

The adaptive selector 45 then compares the fifteen electric power values with each other, and selects the DCT point index number having the maximum electric power. The adaptive selector 45 then compares the remaining fourteen electric power values (other than that of the selected DCT point index number) with each other, and selects the DCT point index number having the maximum electric power. Such a DCT point index number selecting operation is repeated a predetermined number of times. Here, for convenience of the explanation, the predetermined number is 7. Accordingly, the adaptive selector 45 selects 7 DCT point index numbers having larger electric power values from among 15 DCT point index numbers. In the example shown in FIGS. 4 and 5, the DCT point index numbers 0, 4, 2, 3, 9, 1, and 7 are selected sequentially, that is, in order of the amount of electric power from the largest to the smallest. Here, although the DCT point index numbers 7 and 12 have the same electric power value "12", only the DCT point index number 7, which is smaller than 12 and thus corresponds to a lower frequency component, is selected due to the limitation on a selected number of the DCT point index numbers.

Next, the adaptive selector 45 outputs to the quantizer 46 only 7 DCT coefficients to the quantizer 46, which correspond to the DCT point index numbers 0, 1, 2, 3, 4, 7, and 9 as the above selected results, from among 15 DCT coefficients which form the discrete cosine transform data. The adaptive selector 45 also outputs the DCT point index numbers 0, 1, 2, 3, 4, 7, and 9 (as the selected results) as the DCT point index information A to the control unit 44. The control unit 44 inputs the DCT point index information A (i.e., the DCT point index numbers 0, 1, 2, 3, 4, 7, and 9) into the control data C.

The quantizer 46 allocates bits to the seven DCT coefficients (input from the adaptive selector 45) in accordance with the instructions from the control unit 44. For example, the quantizer 46 uniformly allocates a predetermined number of bits to each of the seven DCT coefficients. In another example, for a number of bits which can be allocated, the higher the electric power of the DCT coefficient, the larger the number of bits allocated to the DCT coefficient. The control unit 44 inputs the relevant bit allocation information into the control data C. The quantizer 46 outputs the seven DCT coefficients (after the bit allocation) as compressed data to the variable-length encoding unit 43.

The variable-length encoding unit 43 subjects the compressed data received from the quantizer 46 to variable-length encoding, and outputs obtained channel state information compression encoded data B to the control information sending unit 25. The control unit 44 outputs the control data C, which includes the DCT point index information A and the bit allocation information, to the control information sending unit 25. Accordingly, the control information sending unit 25 sends the channel state information compression encoded data B and the control data C (i.e., the DCT point index information A and the bit allocation information) to the MIMO transmitter 1.

Next, the operation of the information expanding unit 52 relating to Specific Example 1 will be explained. For convenience of the explanation, the concrete examples used in the explanation of the information compressing unit 42 for Specific Example 1 are also used here.

In the MIMO transmitter 1, the channel state information compression encoded data B received by the control information receiving unit 13 is subjected to variable-length decoding in the variable-length decoding unit 51. The compressed data obtained by the variable-length decoding of the channel state information compression encoded data B is input into the inverse quantizer 55 in the information expanding unit 52. In addition, the control data C received by the control information receiving unit 13 is input into the control unit 54. The control unit 54 output the DCT point index information A included in the received control data C to the information compensator 56, and also outputs the bit allocation information included in the control data C to the inverse quantizer 55.

Based on the received bit allocation information, the inverse quantizer 55 obtains DCT coefficients of the discrete cosine transform data from the compressed data received from the variable-length decoding unit 51. Here, seven DCT coefficients are obtained. The inverse quantizer 55 outputs the obtained seven DCT coefficients to the information compensator 56.

When the information compensator 56 receives the seven DCT coefficients from the inverse quantizer 55, the information compensator 56 compensates for missing DCT coefficients based on the DCT point index information A received from the control unit 54. Here, the DCT point index information A includes the DCT point index numbers 0, 1, 2, 3, 4, 7, and 9. Therefore, among the fifteen DCT coefficients from 0 to 14, eight DCT coefficients of 5, 6, 8, 10, 11, 12, 13, and 14 are missing. Accordingly, the information compensator 56 complements each of the DCT coefficients of 5, 6, 8, 10, 11, 12, 13, and 14 with a predetermined value "0".

The information compensator 56 outputs the discrete cosine transform data having the complemented fifteen DCT coefficients to the IDCT unit 53. The IDCT unit 53 subjects the discrete cosine transform data to inverse discrete cosine transform, and outputs the obtained channel state information (CSI) to the precoding unit 11.

In accordance with Specific Example 1, when selecting each frequency component to be included in the compressed data from the discrete cosine transform data, a predetermined number of frequency components are selected in order of the amount of electric power from the largest to the smallest. Accordingly, information of frequency components having relatively high electric power is supplied from the MIMO receiver 2 to the MIMO transmitter 1. Therefore, information compression having a high accuracy for the channel state information can be implemented. Specific Example 1 is especially effective when the amount of control information which can be transmitted from the MIMO receiver 2 to the MIMO transmitter 1 is fixed. In addition, since the frequency components included in the compressed data are selected in order of the amount of electric power from the largest to the smallest, it is possible to prevent the accuracy of the channel state information from degrading due to excluding of frequency components having relatively high electric power.

Additionally, DCT has a characteristic in which information is concentrated into low-frequency components, and the degree of concentration is considerable in comparison with other time-to-frequency region conversion methods (e.g., DFT or DWT). Therefore, when the number of frequency components to be included in the compressed data is fixed, the accuracy of the channel state information can be improved by using DCT.

Specific Example 2

In Specific Example 2, the adaptive selector 45 selects each frequency component to be included in compressed data from among the discrete cosine transform data in order of the amount of electric power (i.e., the higher the electric power of the frequency component, the earlier the frequency component is selected) until the total value of the electric power reaches a predetermined value. The operation of the information compressing unit 42 in Specific Example 2 will be explained in detail below. Since the operation of the information expanding unit 52 is similar to that in Specific Example 1, explanation thereof is omitted here.

For convenience of the explanation of the information compressing unit 42, the examples shown in FIGS. 4 and 5 are employed similar to Specific Example 1.

The adaptive selector 45 receives discrete cosine transform data from the DCT unit 41, where the discrete cosine transform data includes DCT coefficients as information of each frequency component. The discrete cosine transform data of the DCT results consists of 15 DCT coefficients having DCT point index numbers 0 to 14. The DCT point index number 0 corresponds to a DCT coefficient of a direct current (DC) component, and the greater the DCT point index number, the higher the frequency component of the DCT coefficient.

For each DCT point index number, the adaptive selector 45 computes the electric power of the frequency component by using the DCT coefficient specified by the DCT point index number. The method of computing the electric power is similar to that in Specific Example 1. Accordingly, the adaptive selector 45 computes 15 electric power values corresponding to the DCT point index numbers 0 to 14 as shown in FIGS. 4 and 5.

The adaptive selector 45 then compares the fifteen electric power values with each other, and selects the DCT point index number having the maximum electric power. The adaptive selector 45 sets the maximum electric power value as an initial value to an electric power accumulating register in the adaptive selector 45.

The adaptive selector 45 then compares the remaining fourteen electric power values (other than that of the selected DCT point index number) with each other, and selects the DCT point index number having the maximum electric power. The adaptive selector 45 adds the maximum electric power value to the value stored in the electric power accumulating register so as to update the register.

Such a DCT point index number selecting and electric power adding operation is repeated until the value stored in the electric power accumulating register reaches a predetermined value. That is, each time a value is set to the electric power accumulating register, the value stored in the electric power accumulating register is compared with the predetermined value. When the value stored in the electric power accumulating register becomes greater than or equal to the predetermined value, the DCT point index number selecting and electric power adding operation is completed.

Here, the predetermined value is 40 as a concrete example for convenience of the explanation. Accordingly, the adaptive selector 45 selects a total of five DCT point index numbers of 0 (having an electric power value of 10), 4 (having an electric power value of 9), 2 (having an electric power value of 8), 3 (having an electric power value of 7), and 9 (having an electric power value of 7) are selected from among the fifteen electric power values until the total value of the electric power reaches 40. The predetermined value for the total value of the electric power may be a fixed value or may be provided as a ratio with respect to an average value.

Next, the adaptive selector 45 outputs to the quantizer 46 only 5 DCT coefficients to the quantizer 46, which correspond to the DCT point index numbers 0, 2, 3, 4, and 9 as the above selected results, from among 15 DCT coefficients which form the discrete cosine transform data. The adaptive selector 45 also outputs the DCT point index numbers 0, 2, 3, 4, and 9 (as the selected results) as the DCT point index information A to the control unit 44. The control unit 44 inputs the DCT point index information A (i.e., the DCT point index numbers 0, 2, 3, 4, and 9) into the control data C.

Since operations of the quantizer 46, the variable-length encoding unit 43, and the control unit 44 are similar to those in Specific Example 1, explanations thereof are omitted here.

In accordance with Specific Example 2, when selecting each frequency component to be included in the compressed data from the discrete cosine transform data, frequency components are selected in order of the amount of electric power from the largest to the smallest until the total value of the electric power of the frequency components (to be included in the compressed data) reaches a predetermined value. Accordingly, information of frequency components having relatively high electric power is supplied from the MIMO receiver 2 to the MIMO transmitter 1. Therefore, information compression having a high accuracy for the channel state information can be implemented. In addition, since the total value of the electric power of the frequency components to be included in the compressed data is greater than or equal to the predetermined value, it is possible to secure a constant accuracy of the channel state information. Specific Example 2 is especially effective when such a constant accuracy of the channel state information is required. In addition, since the frequency components included in the compressed data are selected in order of the amount of electric power from the largest to the smallest, it is possible to prevent the accuracy of the channel state information from degrading due to excluding of frequency components having relatively high electric power.

Additionally, DCT has a characteristic in which information is concentrated into low-frequency components, and the degree of concentration is considerable in comparison with other time-to-frequency region conversion methods (e.g., DFT or DWT). Therefore, when the total value of the electric power of frequency components to be included in the compressed data is fixed, the number of the DCT point index numbers transmitted from the MIMO receiver 2 to the MIMO transmitter 1 can be reduced by using DCT.

Specific Example 3

In Specific Example 3, DCT is used as the time-to-frequency region conversion method for the channel state information. In Specific Example 3, the adaptive selector 45 selects each frequency component to be included in compressed data from among the discrete cosine transform data in order of the frequency from the lowest to the highest. This is because in case of DCT, information is concentrated onto low-frequency components, and thus a desired accuracy of the channel state information can be maintained although information of the high-frequency components is reduced or deleted. Accordingly, information of the low-frequency components are especially included in the compressed data. The operations of the information compressing unit 42 and the information expanding unit 52 in Specific Example 3 will be explained in detail below.

For convenience of the explanation of the information compressing unit 42, the examples shown in FIGS. 4 and 5 are employed similar to Specific Example 1.

First, the information compressing unit 42 will be explained. The adaptive selector 45 receives discrete cosine transform data from the DCT unit 41, where the discrete cosine transform data includes DCT coefficients as information of each frequency component. The discrete cosine transform data of the DCT results consists of 15 DCT coefficients having DCT point index numbers 0 to 14. The DCT point index number 0 corresponds to a DCT coefficient of a direct current (DC) component, and the greater the DCT point index number, the higher the frequency component of the DCT coefficient.

The adaptive selector 45 first selects the minimum DCT point index number 0 from among 15 DCT point index numbers 0 to 14, and computes the electric power of the frequency component by using the DCT coefficient of the selected DCT point index number 0. The adaptive selector 45 sets the computed electric power value as an initial value to an electric power accumulating register in the adaptive selector 45.

The adaptive selector 45 then selects the minimum DCT point index number 1 from among the remaining fourteen DCT point index numbers 1 to 14 (other than the previously-selected DCT point index number 0), and computes the electric power of the frequency component by using the DCT coefficient of the selected DCT point index number 1. The adaptive selector 45 adds the computed electric power value to the value stored in the electric power accumulating register so as to update the register.

Such a DCT point index number selecting and electric power adding operation is repeated until the value stored in the electric power accumulating register reaches a predetermined value. That is, each time a value is set to the electric power accumulating register, the value stored in the electric power accumulating register is compared with the predetermined value. When the value stored in the electric power accumulating register becomes greater than or equal to the predetermined value, the DCT point index number selecting and electric power adding operation is completed.

Here, the predetermined value is 40 as a concrete example for convenience of the explanation. Accordingly, the adaptive selector 45 selects totally six DCT point index numbers of 0 (having an electric power value of 10), 1 (having an electric power value of 5), 2 (having an electric power value of 8), 3 (having an electric power value of 7), 4 (having an electric power value of 9), and 5 (having an electric power value of 1) are selected from among the fifteen DCT point index numbers 0 to 14 starting from the minimum number until the total value of the electric power reaches 40. The predetermined value for the total value of the electric power may be a fixed value or may be provided as a ratio with respect to an average value.

Next, the adaptive selector 45 outputs to the quantizer 46 only 6 DCT coefficients to the quantizer 46, which correspond to the DCT point index numbers 0 to 5 as the above selected results, from among 15 DCT coefficients which form the discrete cosine transform data. In the results of the DCT point index number selection, the adaptive selector 45 outputs only the maximum DCT point index number 5 as the DCT point index information A to the control unit 44. The control unit 44 inputs the DCT point index information A (i.e., the DCT point index number 5) into the control data C.

Since operations of the quantizer 46, the variable-length encoding unit 43, and the control unit 44 are similar to those in Specific Example 1, explanations thereof are omitted here.

Next, the operation of the information expanding unit 52 relating to Specific Example 3 will be explained. Since operations of the variable-length decoding unit 51, the inverse quantizer 55, and the control unit 54 are similar to those in Specific Example 1, explanations thereof are omitted here.

When the information compensator 56 receives the six DCT coefficients from the inverse quantizer 55, the information compensator 56 compensates for missing DCT coefficients based on the DCT point index information A received from the control unit 54. Here, the DCT point index information A has the DCT point index number 5, which is the maximum value among the DCT point index numbers of the DCT coefficients received from the inverse quantizer 55. Therefore, DCT coefficients of the DCT point index number 6 and after are missing, so that the information compensator 56 complements each of the DCT coefficients of 6 to 14 with a predetermined value "0".

The information compensator 56 outputs the discrete cosine transform data having the complemented fifteen DCT coefficients to the IDCT unit 53. The IDCT unit 53 subjects the discrete cosine transform data to inverse discrete cosine transform, and outputs the obtained channel state information (CSI) to the precoding unit 11.

In accordance with Specific Example 3, when selecting each frequency component to be included in the compressed data from the discrete cosine transform data, frequency components are selected in order of the frequency from the lowest to the highest until the total value of the electric power of the frequency components (to be included in the compressed data) reaches a predetermined value. Accordingly, information of relatively low frequency components is supplied from the MIMO receiver 2 to the MIMO transmitter 1. Therefore, information compression having a high accuracy for the channel state information can be implemented. In addition, since the total value of the electric power of the frequency components to be included in the compressed data is greater than or equal to the predetermined value, it is possible to secure a constant accuracy of the channel state information. Furthermore, since only one DCT point index number is transmitted from the MIMO receiver 2 to the MIMO transmitter 1, the amount of control information sent from the MIMO receiver 2 to the MIMO transmitter 1 can be minimized.

While preferred embodiments of the present invention have been described and illustrated above, it should be understood that these are exemplary embodiments of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

For example, the channel state information may be a channel response matrix defined between a plurality of reception antennas and a plurality of transmission antennas. In this case, information compression can be performed while securing a preferable accuracy of the channel response matrix. Therefore, in the relevant MIMO system, the MIMO transmitter 1 can appropriately precode the channel response matrix obtained by the MIMO receiver 2, and it is possible to reduce the amount of information required for the channel response matrix sent from the MIMO receiver 2 to the MIMO transmitter 1. Accordingly, the effect of precoding can be secured, and the amount of wireless resources used for transmitting the channel response matrix can be reduced.

The wireless communication system to which the present invention is applied may employ a multicarrier transmission method or a single-carrier transmission method. The multicarrier transmission method may be an OFDM (orthogonal frequency division multiplexing) method. In addition, the present invention can also be applied to a wireless communication system other than the MIMO system so as to compress channel state information which indicates the state of each communication channel.

Additionally, a program for implementing the function of the channel state information compressing unit 24 shown in FIG. 2 or the function of the channel state information expanding unit 14 shown in FIG. 3 may be stored in a computer-readable storage medium, and the stored program may be loaded on and executed by a computer system, so as to perform the channel state information compression or the channel state information expansion. The computer system may include an operating system and hardware resources such as peripheral devices.

The computer-readable storage medium is a storage device which may be (i) a portable medium such as a flexible disk, a magneto-optical disk, a writable non-volatile memory (e.g., ROM or flash memory), or a DVD (digital versatile disk), or (ii) a hard disk installed in the computer system.

The computer-readable storage medium may be a memory which stores the program for a specific time, such as a volatile memory (e.g., a DRAM (dynamic random access memory)) in the computer system which functions as a server or client when the program is transmitted via a network (e.g., the Internet) or through a communication line (e.g., telephone line).

The above program may be transmitted from the computer system (which stores the program in a storage device or the like) via a transmission medium (on transmitted waves through the transmission medium) to another computer system. The transmission medium through which the program is transmitted is a network such as the Internet or a communication line such as a telephone line, that is, a medium which has a function of transmitting data.

In addition, a program for performing a portion of the above-explained processes may be used. Furthermore, a differential file (i.e., a differential program) to be combined with a program which has already been stored in the computer system may be provided to realize the above processes.

What is claimed is:

1. A channel state information compressing apparatus provided in a receiver of a MIMO system in which a transmitter precodes transmitted data based on information received from the receiver, wherein the channel state information compressing apparatus comprises:
a time-to-frequency region converter that converts a region for channel state information which indicates a state of each communication channel from a time region to a frequency region, where the channel state information is a channel response matrix defined between a plurality of reception antennas of the receiver and a plurality of transmission antennas of the transmitter; and
an adaptive selector that selects each frequency component to be included in compressed data based on electric power of the frequency component from among frequency region data obtained by the time-to-frequency region converter,
wherein the adaptive selector selects a predetermined number of frequency components in order of an amount of the electric power from the largest to the smallest,
wherein the channel state information compressing apparatus outputs the compressed data consisting of each selected frequency component, and information for identifying each frequency component which forms the compressed data.

2. The channel state information compressing apparatus in accordance with claim 1, wherein the adaptive selector selects the predetermined number of frequency components in order of the amount of the electric power from the largest to the smallest until the total amount of the electric power of the frequency components to be included in the compressed data reaches a predetermined value.

3. The channel state information compressing apparatus in accordance with claim 1, wherein the time-to-frequency region converter performs discrete cosine transform.

4. A channel state information compressing apparatus provided in a receiver of a MIMO system in which a transmitter precodes transmitted data based on information received from the receiver, wherein the channel state information compressing apparatus comprises:
a time-to-frequency region converter that converts a region for channel state information which indicates a state of each communication channel from a time region to a frequency region, where the channel state information is a channel response matrix defined between a plurality of reception antennas of the receiver and a plurality of transmission antennas of the transmitter; and
an adaptive selector that selects each frequency component to be included in compressed data based on electric power of the frequency component from among frequency region data obtained by the time-to-frequency region converter, wherein:
the time-to-frequency region converter performs discrete cosine transform;
the adaptive selector selects a predetermined number of frequency components in order of frequency of each frequency component from the lowest to the highest until the total amount of the electric power of the frequency components to be included in the compressed data reaches a predetermined value; and
the channel state information compressing apparatus outputs the compressed data consisting of each selected frequency component, and information for identifying each frequency component which forms the compressed data.

5. A channel state information expanding apparatus provided in a transmitter of a MIMO system in which the transmitter precodes transmitted data based on information received from a receiver, wherein the channel state information expanding apparatus comprises:
an information compensator that complements compressed data of frequency region data for channel state information which indicates a state of each communication channel, with each missing frequency component based on information for identifying each frequency component which forms the compressed data, where the channel state information is a channel response matrix defined between a plurality of reception antennas of the receiver and a plurality of transmission antennas of the transmitter, and the compressed data includes each frequency component selected based on electric power thereof, from among the frequency region data obtained by converting a region for the channel response matrix from a time region to a frequency region, wherein a predetermined number of frequency components are selected in order of an amount of the electric power from the largest to the smallest; and a frequency-to-time region converter that converts a region of the frequency region data complemented by the information compensator from the frequency region to the time region.

6. The channel state information expanding apparatus in accordance with claim 5, wherein the frequency-to-time region converter performs inverse discrete cosine transform.

7. A channel state information compressing method used in a MIMO system in which a transmitter precodes transmitted data based on information received from a receiver, wherein the channel state information compressing method comprises the steps of:
  converting a region for channel state information which indicates a state of each communication channel from a time region to a frequency region, where the channel state information is a channel response matrix defined between a plurality of reception antennas of the receiver and a plurality of transmission antennas of the transmitter:
  selecting each frequency component to be included in compressed data based on electric power of the frequency component from among frequency region data obtained by the converting step, wherein a predetermined number of frequency components are selected in order of an amount of the electric power from the largest to the smallest;
  outputting the compressed data consisting of each selected frequency component, and information for identifying each frequency component which forms the compressed data.

8. A channel state information expanding method used in a MIMO system in which a transmitter precodes transmitted data based on information received from a receiver, wherein the channel state information expanding method comprises the steps of:
  complementing compressed data of frequency region data for channel state information which indicates a state of each communication channel, with each missing frequency component based on information for identifying each frequency component which forms the compressed data, where the channel state information is a channel response matrix defined between a plurality of reception antennas of the receiver and a plurality of transmission antennas of the transmitter, and the compressed data includes each frequency component selected based on electric power thereof, from among the frequency region data obtained by converting a region for the channel response matrix from a time region to a frequency region, wherein a predetermined number of frequency components are selected in order of an amount of the electric power from the largest to the smallest; and
  converting a region of the complemented frequency region data from the frequency region to the time region.

9. A non-transitory computer-readable storage medium that stores a program used in a MIMO system in which a transmitter precodes transmitted data based on information received from a receiver, wherein the program makes a computer execute the steps of:
  converting a region for channel state information which indicates a state of each communication channel from a time region to a frequency region, where the channel state information is a channel response matrix defined between a plurality of reception antennas of the receiver and a plurality of transmission antennas of the transmitter;
  selecting each frequency component to be included in compressed data based on electric power of the frequency component from among frequency region data obtained by the converting step, wherein a predetermined number of frequency components are selected in order of an amount of the electric power from the largest to the smallest;
  outputting the compressed data consisting of each selected frequency component, and information for identifying each frequency component which forms the compressed data.

10. A non-transitory computer-readable storage medium that stores a program used in a MIMO system in which a transmitter precodes transmitted data based on information received from a receiver, wherein the program makes a computer execute the steps of:
  complementing compressed data of frequency region data for channel state information which indicates a state of each communication channel, with each missing frequency component based on information for identifying each frequency component which forms the compressed data, where the channel state information is a channel response matrix defined between a plurality of reception antennas of the receiver and a plurality of transmission antennas of the transmitter, and the compressed data includes each frequency component selected based on electric power thereof, from among the frequency region data obtained by converting a region for the channel response matrix from a time region to a frequency region, wherein a predetermined number of frequency components are selected in order of an amount of the electric power from the largest to the smallest; and
  converting a region of the complemented frequency region data from the frequency region to the time region.

11. A receiver in a MIMO system in which a transmitter precodes transmitted data based on information received from the receiver, wherein the receiver comprises:
  a time-to-frequency region converter that converts a region for channel state information between the receiver and the transmitter, where the channel state information is a channel response matrix defined between a plurality of reception antennas of the receiver and a plurality of transmission antennas of the transmitter;
  an adaptive selector that selects each frequency component to be included in compressed data based on electric power of the frequency component from among frequency region data obtained by the time-to-frequency region converter, wherein the adaptive selector selects a predetermined number of frequency components in order of an amount of the electric power from the largest to the smallest; and
  a sending device that sends the transmitter the compressed data consisting of each selected frequency component, and information for identifying each frequency component which forms the compressed data.

12. A transmitter in a MIMO system in which the transmitter precodes transmitted data based on information received from a receiver, wherein the transmitter comprises:
  a receiving device that receives compressed data of frequency region data for channel state information between the transmitter and the receiver and information for identifying each frequency component which forms the compressed data, from the receiver, where the channel state information is a channel response matrix defined between a plurality of reception antennas of the receiver and a plurality of transmission antennas of the transmitter, and the compressed data includes each frequency component selected based on electric power thereof, from among the frequency region data obtained by converting a region for the channel response matrix from a time region to a frequency region, wherein a predetermined number of frequency components are selected in order of an amount of the electric power from the largest to the smallest;

an information compensator that complements the compressed data with each missing frequency component based on the information for identifying each frequency component which forms the compressed data;

a frequency-to-time region converter that converts a region of the frequency region data complemented by the information compensator from the frequency region to the time region; and a precoding device that precodes the transmitted data by using the channel response matrix obtained by the frequency-to-time region converter.

* * * * *